United States Patent
Nilius et al.

(10) Patent No.: US 8,914,547 B2
(45) Date of Patent: Dec. 16, 2014

(54) COMMUNICATION NETWORK AND METHOD FOR STORING MESSAGE DATA IN A COMMUNICATION NETWORK

(75) Inventors: Fabian Nilius, Hamburg (DE); Bernd Watermann, Hamburg (DE)

(73) Assignee: Avaya GmbH & Co. KG (DE)

( * ) Notice: Subject to any disclaimer, the term of this patent is extended or adjusted under 35 U.S.C. 154(b) by 949 days.

(21) Appl. No.: 11/870,830

(22) Filed: Oct. 11, 2007

(65) Prior Publication Data

US 2008/0228948 A1     Sep. 18, 2008

(30) Foreign Application Priority Data

Mar. 14, 2007   (DE) .......................... 10 2007 013 095

(51) Int. Cl.
*G06F 15/16* (2006.01)
*H04L 12/58* (2006.01)
*H04L 29/08* (2006.01)
*H04W 4/12* (2009.01)

(52) U.S. Cl.
CPC ............ *H04L 51/36* (2013.01); *H04L 67/1002* (2013.01); *H04W 4/12* (2013.01); *H04L 67/1095* (2013.01)
USPC .......................................... 709/251; 709/232

(58) Field of Classification Search
USPC ........................................................ 709/251
See application file for complete search history.

(56) References Cited

U.S. PATENT DOCUMENTS

| | | | |
|---|---|---|---|
| 6,560,318 B1 * | 5/2003 | Spielman et al. | 379/88.12 |
| 6,990,514 B1 * | 1/2006 | Dodrill et al. | 709/206 |
| 7,080,400 B1 * | 7/2006 | Navar | 725/139 |
| 7,551,780 B2 * | 6/2009 | Nudd et al. | 382/190 |
| 7,725,912 B2 * | 5/2010 | Margulis | 725/81 |
| 7,769,722 B1 * | 8/2010 | Bergant et al. | 707/681 |
| 7,995,715 B2 * | 8/2011 | Bhatia et al. | 379/88.12 |
| 2001/0021998 A1 * | 9/2001 | Margulis | 725/81 |
| 2002/0010736 A1 * | 1/2002 | Marques et al. | 709/201 |
| 2002/0042915 A1 * | 4/2002 | Kubischta et al. | 725/38 |
| 2002/0174425 A1 * | 11/2002 | Markel et al. | 725/13 |
| 2002/0184635 A1 * | 12/2002 | Istvan | 725/51 |
| 2003/0018721 A1 * | 1/2003 | Gupta et al. | 709/206 |
| 2003/0139174 A1 * | 7/2003 | Rao | 455/418 |

(Continued)

OTHER PUBLICATIONS

Tolksdorf, "12.1: Integration of style sheets in HTML," (with mechanical English translation), Die Sprache des Web: HTML 4 (The Language of the Web: HTML 4), dpunkt.verlag, Heidelberg, 1997, pp. 144-145.

(Continued)

*Primary Examiner* — Brian P Whipple
*Assistant Examiner* — James Edwards
(74) *Attorney, Agent, or Firm* — Sheridan Ross P.C.

(57) ABSTRACT

A communication network having a number of server units connected with each other on the data side, to each of which a number of terminals is connected in a local environment, each server unit including a data storage area for saving message data, shall enable user access to the user-specifically saved message data from each of the local environments in a reliable and quick manner, even in case of limited data transmission capacity between the individual server units, maintaining at the same time an appropriate flow synchronization between the partial networks. For this purpose, each data storage area comprises, according to the invention, a first partial storage area for saving user data and a second partial storage area for saving control data. During operation, the user data are stored on all server units in a synchronized manner.

14 Claims, 1 Drawing Sheet

(56) References Cited

U.S. PATENT DOCUMENTS

| | | | |
|---|---|---|---|
| 2003/0140112 A1* | 7/2003 | Ramachandran et al. | 709/217 |
| 2004/0103434 A1* | 5/2004 | Ellis | 725/58 |
| 2004/0267963 A1 | 12/2004 | Whynot | |
| 2005/0216524 A1 | 9/2005 | Gomes et al. | |
| 2006/0018444 A1 | 1/2006 | Pantana et al. | |
| 2006/0033809 A1* | 2/2006 | Farley | 348/14.01 |
| 2006/0047767 A1* | 3/2006 | Dodrill et al. | 709/206 |
| 2006/0129608 A1* | 6/2006 | Sato et al. | 707/200 |
| 2006/0195548 A1* | 8/2006 | Hunter et al. | 709/217 |
| 2006/0294368 A1* | 12/2006 | Adams et al. | 713/156 |
| 2007/0011261 A1* | 1/2007 | Madams et al. | 709/207 |
| 2007/0067810 A1* | 3/2007 | Durden et al. | 725/80 |
| 2007/0136226 A1* | 6/2007 | Irick | 707/1 |
| 2008/0046591 A1* | 2/2008 | Gilhuly et al. | 709/239 |
| 2008/0172690 A1* | 7/2008 | Kanojia et al. | 725/36 |
| 2008/0184321 A1* | 7/2008 | Lemmons et al. | 725/100 |
| 2008/0261632 A1* | 10/2008 | Hind et al. | 455/466 |
| 2009/0010612 A1* | 1/2009 | Allen et al. | 386/83 |
| 2009/0013087 A1* | 1/2009 | Lorch et al. | 709/232 |
| 2009/0170478 A1* | 7/2009 | Doulton | 455/413 |
| 2009/0319379 A1* | 12/2009 | Joao | 705/14.73 |
| 2010/0014487 A1* | 1/2010 | Attar et al. | 370/335 |
| 2010/0128723 A1* | 5/2010 | Kurganov | 370/352 |
| 2010/0235465 A1* | 9/2010 | Thorpe et al. | 709/217 |
| 2011/0286392 A1* | 11/2011 | Harris et al. | 370/328 |

OTHER PUBLICATIONS

Official Action (No English translation available) for German Patent Application No. 102007013095.5 dated Feb, 19, 2008, 3 pages.

* cited by examiner

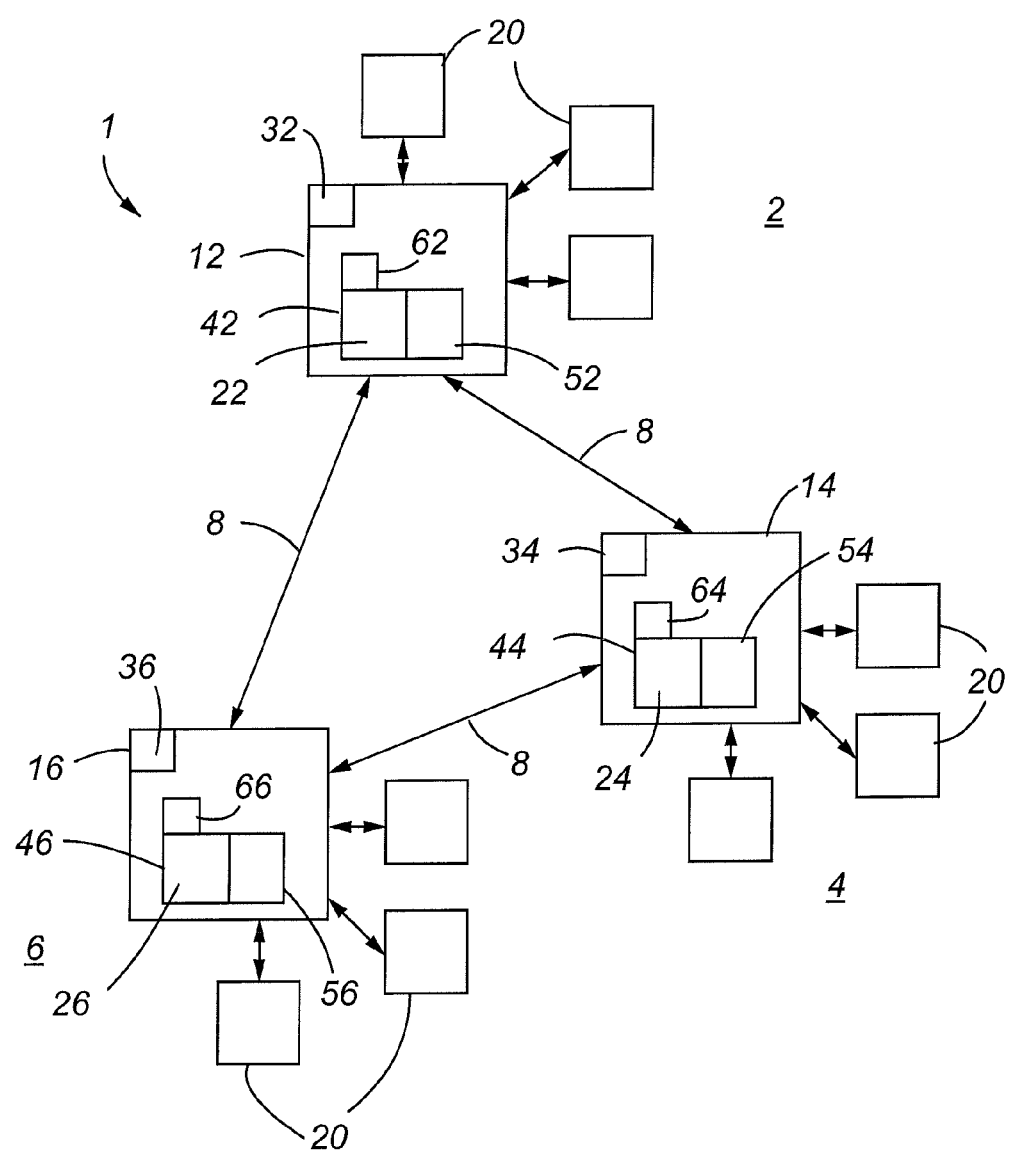

COMMUNICATION NETWORK AND METHOD FOR STORING MESSAGE DATA IN A COMMUNICATION NETWORK

FIELD

The invention relates to a communication network having a number of server units connected with each other on the data side, to each of which a number of terminals is connected in a local environment, each server unit including a data storage area for saving message data. It also relates to a method for storing message data in such a communication network.

BACKGROUND

In a communication network, a plurality of terminals is usually connected in a local environment to a central computing or management unit, usually called "server". The communication network can substantially be supported by computer-based components, but in addition, other communication terminals, such as, for example, telephones or the like, can also be connected.

To manage message data for individual users in such a communication network, a so-called UMS system ("Unified Messaging Service") can be installed. Such a UMS system offers a message management wherein messages (for example voice messages, e-mails, faxes, SMS, MMS, etc.) received or to be sent in any form are transformed into a uniform data format and saved centrally on the server. The user can then be granted access to the centrally saved messages through the most different terminals (so-called "access clients"), i.e. in particular through telephone terminals, mobile phones, e-mail clients, or the like.

In such a UMS system, incoming messages are in a first step digitized, as far as necessary. For example, a text recognition device can be used for printed information, whereas incoming fax messages can also be directly received by a fax server and filed in digital form. Voice messages, for example from an answering machine, on the other hand, will be transformed into sound files and text files and saved. The message data edited in this way are then transmitted to the corresponding user in a unified form, the so-called unified messaging. To grant the user access to the message data, the server unit of the communication network usually includes a data storage area for saving the message data, to which the respective user can access in a suitable form through the respective terminals, possibly after authorization recognition and release.

Communication networks of this type, i.e. UMS systems, are usually designed for organizational units, such as, for example, companies or enterprises, especially also in view of the local environment. In this case, it is of particular advantage within such organizational units that the user can access the message data saved for him with a uniform appearance and, therefore, in a particularly easy and uncomplicated manner, from different terminals, as a rule even from all terminals, within the communication network, so that the user has access to saved messages without requiring further measures, independently of an individual terminal, in a particularly flexible way.

Depending on organizational changes or also technological requirements, it may, however, be necessary to subdivide a communication network, which is actually uniform from the organizational point of view, into a plurality of partial networks with individual local environments. This may be the case, for example, if larger organizational units, such as, for example, enterprises, are distributed over several locations which in part work independently of each other concerning message management. Alternatively, such a structure composed of several partial networks, can, for example, also be created if several existing local communication networks shall be combined in a unified system. This could be the case, for example, if a plurality of units, formerly operating independently of each other, shall be combined in a larger structure, as, for example, in the case of a reorganization in the field of public health, if several hospitals, formerly operating independently of each other, are combined from an organizational point of view. In such a case, i.e. when linking and combining several already existing partial networks, it is in particular possible that the crossover line and connection structures can be designed with a limited performance offer only, so that data quantities cannot be exchanged changed between the individual partial networks to any desired extent and at any desired speed.

Nevertheless, however, it can be desirable exactly in such situations to provide the functionality properly speaking of a UMS system, i.e. to make the saved message data available to a user from substantially each terminal of the overall network, i.e. in particular also in a cross-partial network manner. In this connection, it should also be considered that the individual work flows of data management on the individual partial networks should be synchronized with each other, but should influence each other as little as possible.

SUMMARY

Therefore, the invention is based on the problem to provide, a communication network of the above-mentioned type, which shall enable user access to the user-specifically saved message data from each of the local environments in a reliable and quick manner, even in case of limited data transmission capacity between the individual server units, maintaining at the same time an appropriate flow synchronization between the partial networks. In addition, a method particularly well suited for this purpose for storing message data in such a communication network shall be provided.

Regarding the communication network, this problem is solved according to the invention by the fact that the data storage area of each server unit comprises a first partial storage area for saving user data and a second partial storage area for saving control data.

The invention is based on the consideration that the desired UMS functionality, i.e. in particular the possibility of access to user-specific message data with a uniform appearance from substantially each terminal, is achievable, even in case of distributed networks of the above-mentioned type, in which server units positioned in different local environments form together an overall compound network, by making the message data available to the respective user on each server unit of said compound network. This presupposes, however, that user-specific message data, for example an incoming fax, an incoming voice message or an incoming e-mail arriving on any of the server units, are forwarded quickly and immediately to the other server units, so that they are kept available on the other server units, too, and are callable via the terminals connected there.

In order to limit, however, on the one hand, the resulting considerable additional data traffic, in particular in view of possibly limited transmission capacities, a replication of data associated therewith between the server units should purposefully be limited and be adapted to the absolutely necessary data. On the other hand, the additional data traffic due to this cross-synchronization of data should interfere as little as possible with the data management properly speaking, in order to avoid a collision of commands or also a possibly redundant or double execution of control commands.

Therefore, concerning the cross-synchronization of data, one takes into account in particular the knowledge that the usually arising message data saved in the data storage area of a storage unit contain, in addition to the user data properly speaking of the user-related information, also or directly control sequences of the message files or control data which exclusively concern the respective local environment. Such control data can be, for example, local destination addresses, sending times, printer addresses, characteristics for forwarding jobs and the like.

Making specific use of the knowledge that such data, which mainly concern the sequence control of the data processing processes on the respective server unit, are, on the one hand, of minor interest to the user and might, on the other hand, generate an undesired redundancy in the management, for example a double creation of print-outs, a filtering and selection by data category is now provided already at the moment of saving the message data, whereby the message data concerning the user in a narrower sense are separated as user data from the control data concerning the processing sequences and are saved separately in the data storage area of the respective server unit, so that a focussed and selective further processing of the data is possible.

To guarantee the desired UMS functionality, i.e. in particular the availability of the message data not only in the respective server unit, but in the entire compound network, a quick selective forwarding of the user data, but not of the control data, to all server units is provided in an advantageous embodiment. For this purpose, in an advantageous embodiment, a synchronization module is allocated to the respective first partial storage area in each server unit, which, after a saving of new or changed user data not occasioned by another synchronization module, forwards these data to the respective other server units for saving them in their respective first partial storage area. In this way, it is guaranteed that incoming new user data are quickly and immediately forwarded by the server unit on which they first arrived to the other server units and are saved there, so that the current user data can also be called from the terminals connected to the other server units.

In case of a change of the user data, for example if the user edits or modifies the messages saved for him, such a user-controlled change of the data will also be forwarded by the server unit through which the user accessed the data to the other server units, in the manner of a synchronization or replication, so that the set of user data is quickly kept synchronously between all server units. Only the modifications occasioned by the synchronization modules of the individual server units are excluded from such a forwarding of an update of the user data from one server unit to the other server units, as these are not due to a "real" change of the user data, i.e. incoming new messages or active modifications made by users, but are only the result of the synchronization carried out.

For a reliable separation of the message data requiring handling into user data on the one hand and control data on the other hand, each server unit advantageously comprises a filter module splitting the incoming data flows into user data on the one hand and control data on the other hand.

To achieve the above-mentioned and desired functionality, it is advantageously possible to access from each terminal the user and control data saved on the server unit connected with said terminal. Of course, an authorization request or the like can be connected upstream, in order to exclude unauthorized data manipulations through other users.

Advantageously, message files are provided as user data. These can in particular be available in the form of text files, for example for e-mails or fax messages, or in the form of voice messages, for example as voice mails.

Regarding the method, the above-mentioned problem is solved by splitting the message data into user data on the one hand and control data on the other hand, the user data being stored separately from the control data. The user data are advantageously stored on all server units in a synchronized manner, in order to enable the user in this way to access his user data independently of the respective local environment and of the respective terminal.

The advantages achieved with the invention consist in particular in the fact that due to the consistent separation of the message data as a whole into user data on the one hand and control data on the other hand and the corresponding separate saving in the individual server units, a specific synchronization and replication of the data, adapted to the actual demand, can be established between the server units. In this way, the accessibility of the user data through all server units can be guaranteed with limited data transmission expenditure. Conflict situations caused by exchanged control data, which in another local environment than their original environment might trigger faulty command sequences or might also generate unnecessary double processing in the data management, are avoided in this way.

In this connection, user data are in particular off-line messages, i.e., for example, faxes, e-mails, voice mails (answering machines), as well as callable fax files for fax on demand. These data are preferably stored uniformly in MIME format, i.e. a voice mail like an e-mail with wav file, a fax like an e-mail with tif appendix, whereas control data are, for example jobs: A message shall be sent. Jobs contain the receiver, the desired sending hour, possibly the letterhead to be used, and similar information. Alternatively, for example, also events are possible: A new message has come in; a job has been processed. When processing events, acknowledge messages, for example, are generated.

BRIEF DESCRIPTION OF THE DRAWING

FIG. 1 is schematic diagram of a communication network in accordance with embodiments of the present invention.

DETAILED DESCRIPTION

An exemplary embodiment of the invention is explained in detail with reference to FIG. 1, which is a schematic diagram of a communication network in accordance with embodiments of the present invention.

The communication network 1, as shown in FIG. 1, is composed of a plurality of single networks 2,4,6, connected with each other through suitable data lines 8, in particular through suitable WAN technology, for forming a compound network, each single network 2,4,6 forming in the manner of a local environment a local network serving a corresponding user group or organizational unit or the like, whereby the single networks 2,4,6 may correspond to individual locations of an enterprise, individual organizational units of an overall compound unit or the like, each of these units acting substantially independently of the others in its local environment formed by the respective single network 2,4,6. The communication network 1 formed through the connection of the single networks 2,4,6 with each other can, for example, also be formed through the logistic and organizational combination of previously independent units, for example, in the organizational combination of several units, such as, for example, hospitals, into a larger compound unit.

Each single network 2,4,6 is designed in the manner of a UMS system, in which a user is granted access, in a centralized form, to message data saved for him user-specifically. Each single network 2,4,6 comprises a server unit 12,14,16, a number of terminals 20 being connected to the respective server unit 12,14,16 for forming the local environment of the respective single network 2,4,6. The terminals as such can be terminals, PC systems, telephone terminals, fax machines or other suitable communication devices.

To provide the UMS functionality, i.e. in particular the callability of saved message data by the respective user from any terminal 20 of the respective local environment, each server unit 12,14,16 comprises a data storage area 22,24,26, in which user-related message data can be saved. For saving the message data, a unified data format is provided, whereby in the manner of conventional UMS systems, all incoming message data, such as, for example, voice messages, text messages, e-mails, and the like are first of all digitized, if necessary, and then saved in a suitable able manner as a file. The user can then access the respective data storage area 22,24,26 of the allocated server unit 12,14,16 by means of the respective terminal 20.

In addition, however, the communication network 1 is also designed for making such a UMS functionality accessible to users in the overall network or overall compound unit, beyond the respective local environment. In order not to exceed the data transmission capacities of the data lines 8 and to enable in this way a reliable, safe and quick provision of the necessary data, a purposeful filtering and pre-processing of new incoming message data is, however, provided on the respective server unit 12,14,16. For this purpose, each server unit 12,14,16 includes an integrated filter module 32,34,36, to which new and in particular external incoming message data, such as, for example, incoming fax messages or e-mails, are first of all supplied. In the filter module 32,34,36, the new incoming message data are selected into user data on the one hand and control data on the other hand, the user data reflecting the contents of the messages properly speaking. The user data are the text data properly speaking of the messages files, sound files for corresponding voice messages, and the like. Alternatively, the user data can already implicitly be separated from the control data through different partial storage areas occupied by them, so that the splitting into user data and control data is already effected by the server units 12,14,16 during the storing operation. In this case, the filter modules 32,34,36 are in principle dispensable as independently implemented units or can be replaced by simpler modules with relative data forwarding.

On the other hand, the data in which local control information for data management, for example information on printer jobs, IP destination addresses, and the like, are specified, are recognized as control data. Separated by the respective filter module 32,34,36, the incoming message data are thus saved in the data storage area 22,24,26, each of the data storage areas 22,24,26 comprising a first partial storage area 42,44,46 provided for saving user data and a second partial storage area 52,54,56 provided for saving the control data. Therefore, coming from the respective filter module 32,34,36, the user data of the respective incoming message data are stored in the first partial storage areas 42,44,46 and the control data, in the second partial storage areas 52,54,56.

Based on this selective and separated saving, the user data (but not the control data) are kept synchronously between the individual server units 12,14,16 and are updated within the communication network 1. For this purpose, each server unit 12,14,16 comprises a synchronization module 62,64,66 allocated to the first storage area 42,44,46, said synchronization module 62,64,66 being designed for transmitting, in case of a new saving or modification of the user data in the respective allocated first partial storage area 42,44,46, the correspondingly changed user data to the respective other server units 12,14,16. In this way, in particular new incoming messages or also modifications made on already saved messages, effected by the user or another authorized person, are quickly forwarded from the first server unit to the respective other server units 12,14,16, so that on all server units 12,14,16, the same data set, in view of the user data saved in the respective first partial storage areas 42,44,46, is saved. The synchronization module 62,64,66 will, however, forward such modified or new incoming user data only if the new incoming user data were not transmitted by another synchronization module 62,64,66.

Through the separation of the message data as a whole into user data on the one hand and control data on the other hand, it can, therefore, be guaranteed that the data relevant for the user are kept synchronously on all server units 12,14,16 and can thus be made callable from all terminals 20 of the communication network 1 as a whole. In this way, maintaining a uniform appearance in the entire compound network, the user can access the user data saved in a user-specific manner in the entire compound network, the user being able to effect this independently of the respective terminal 20 and also independently of the local environment defined by the respective single network 2,4,6. This is achievable with only limited data exchange, because the control data are not at the same time exchanged and updated. Therefore, the desired UMS functionality is established in the entire compound network with only limited data transmission capacity of the data lines 8.

LIST OF REFERENCE NUMBERS

1 Communication network
2, 4, 6 Single network
8 Data line
12, 14, 16 Server unit
20 Terminal
22, 24, 26 Data storage area
32, 34, 36 Filter module
42, 44, 46 First partial storage area
52, 54, 56 Second partial storage area
62, 64, 66 Synchronization module

The invention claimed is:

1. A communication network having a number of server units connected with each other, to each of which a number of terminals is connected in a local environment, each server unit including a processor receiving a message comprising message data, the message data comprising new or changed user data and control data, the processor saving the new or changed user data and the control data, a data storage area comprising a first partial storage area for saving the new or changed user data and a second partial storage area for saving the control data, wherein the user data and the control data can be accessed from each of the number of terminals connected to each of the number of server units, wherein in each server unit of which a synchronization module is allocated to each first partial storage area, said synchronization module, after saving the new or changed user data and in response to receiving the incoming message containing the new or changed user data and the control data, forwards the new or changed user data, but not the control data, to the respective other server units for saving the forwarded user data in each of the other server unit's respective first partial storage area.

2. The communication network according to claim 1, wherein each server unit comprises a filter module, which splits an incoming data flow into the new or changed user data and the control data.

3. The communication network according to claim 1, wherein a user of each terminal has access to the new or changed user data and the control data saved on the server unit connected with said terminal.

4. The communication network according to claim 1, wherein message files are provided as user data.

5. The communication network according to claim 1, wherein each server unit comprises a filter module operable to split the received message into the new or changed user data and the control data.

6. The communication network according to claim 1, wherein a user of each terminal has access to the new or changed user data and the control data saved on the server unit connected with the terminal.

7. The communication network according to claim 1, wherein message files are provided as user data.

8. The communication network according to claim 1, wherein forwarding the new or changed user data, but not the control data to the respective other server units is accomplished only if the new incoming user data was not transmitted by another synchronization module.

9. A method for storing message data in a communications network comprising:
providing a number of server units connected with one another, and to each of the server units is connected a number of terminals in a local environment;
receiving a message comprising the message data, the message data comprising new or changed user data and control data, and
storing the message data in a data storage area in each of the server units, the message data being split into the new or changed user data and the control data and each data storage area comprising a first partial storage area for saving the new or changed user data and a second partial storage area for saving the control data, wherein the new or changed user data and the control data can be accessed from each of the number of terminals connected to each of the number of server units, wherein, in each server unit of which a synchronization module is allocated to each first partial storage area, said synchronization module, after saving the new or changed user data and in response to receiving the incoming message containing the new or changed user data and the control data, forwards the new or changed user data, but not the control data, to the respective other server units for saving the forwarded user data in each of the other server unit's respective first partial storage area.

10. The method according to claim 9, wherein the new or changed user data is stored on all server units in a synchronized manner.

11. The method according to claim 9, wherein the new or changed user data is stored in the data storage area of each server unit separately from the control data.

12. The method according to claim 9, further comprising: splitting an incoming data flow into the new or changed user data and the control data.

13. A communication network comprising:
two or more terminals; and
two or more server units connected with each other and connected to the two or more terminals in a local environment, wherein each server comprises:
a data storage area comprising a first partial storage area for saving new or changed user data and a second partial storage area for saving control data; and
a synchronization module allocated to the first partial storage area, said synchronization module, after a saving the new or changed user data and in response to receiving an incoming message containing the new or changed user data and the control data, forwards the new or changed user data, but not the control data, to the respective other server units for saving the forwarded new or changed user data in each of the other server unit's respective first partial storage area.

14. The communication network according to claim 13, wherein forwarding the new or changed user data, but not the control data to the respective other server units is accomplished only if the new incoming user data was not transmitted by another synchronization module.

* * * * *